United States Patent
Tangirala et al.

(10) Patent No.: US 12,470,601 B2
(45) Date of Patent: Nov. 11, 2025

(54) INTEGRATING SD-WAN CONSTRUCTS WITH SASE SECURITY POLICIES

(71) Applicant: Cisco Technology, Inc., San Jose, CA (US)

(72) Inventors: Srilatha Tangirala, San Jose, CA (US); Venkatesh Nataraj, Union City, CA (US); Ambika Basappa Chandrappa, Milpitas, CA (US); Kartik Katti, Milpitas, CA (US); Sasi Veera, San Ramon, CA (US); Balaji Sundararajan, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 305 days.

(21) Appl. No.: 18/224,220

(22) Filed: Jul. 20, 2023

(65) Prior Publication Data
US 2025/0030737 A1   Jan. 23, 2025

(51) Int. Cl.
H04L 9/40   (2022.01)

(52) U.S. Cl.
CPC .......... H04L 63/20 (2013.01); H04L 63/0236 (2013.01); H04L 63/0272 (2013.01); H04L 63/029 (2013.01)

(58) Field of Classification Search
None
See application file for complete search history.

(56) References Cited

U.S. PATENT DOCUMENTS

| | | | |
|---|---|---|---|
| 11,563,601 B1 * | 1/2023 | K S | H04L 12/4633 |
| 2010/0275008 A1 * | 10/2010 | Murrill | H04L 61/2503 713/153 |
| 2015/0326532 A1 | 11/2015 | Grant et al. | |
| 2015/0358358 A1 | 12/2015 | Karhade | |
| 2016/0112460 A1 * | 4/2016 | Li | H04L 63/0263 726/1 |

(Continued)

FOREIGN PATENT DOCUMENTS

| | | |
|---|---|---|
| EP | 3841723 B1 | 5/2022 |
| EP | 4187868 A1 | 5/2023 |

OTHER PUBLICATIONS

Search Report and Written Opinion for PCT Application No. PCT/US2024/037828, Dated Oct. 17, 2024, 17 pages.

*Primary Examiner* — Scott B Christensen
(74) *Attorney, Agent, or Firm* — Lee & Hayes, P.C.

(57) ABSTRACT

Techniques for automatically integrating SD-WAN constructs to security policies are described. The techniques may include defining, by a security cloud provider, a security policy for an entity, the entity represented by a VPN security policy label and the security policy absent source and destination CIDR IP addresses. The security cloud provider notifies an SD-WAN controller of the security policy. The SD-WAN controller maps the VPN security policy label to an IP address pool and a VPN ID. The SD-WAN controller generates an enhanced security policy by automatically adding source and destination CIDR IP addresses to the security policy. The SD-WAN controller deploys the enhanced security policy to an SD-WAN branch router and generates a VPN segment between the SD-WAN branch router and the security cloud provider to establish a common secure internet gateway tunnel for the IP address pool.

20 Claims, 6 Drawing Sheets

(56) References Cited

U.S. PATENT DOCUMENTS

| | | | |
|---|---|---|---|
| 2018/0026944 A1* | 1/2018 | Phillips | H04L 63/1433 |
| | | | 726/4 |
| 2019/0075133 A1 | 3/2019 | Chen et al. | |
| 2020/0059492 A1* | 2/2020 | Janakiraman | H04L 12/4641 |
| 2020/0195607 A1 | 6/2020 | Wang et al. | |
| 2020/0274852 A1* | 8/2020 | Ahmed | H04L 63/0263 |
| 2020/0389796 A1* | 12/2020 | Olofsson | H04L 63/0227 |
| 2021/0185013 A1 | 6/2021 | Zhang et al. | |
| 2022/0376982 A1 | 11/2022 | Sundararajan et al. | |
| 2024/0007492 A1* | 1/2024 | Shen | H04L 63/1425 |
| 2024/0236142 A1* | 7/2024 | Vanveerdeghem | H04L 63/20 |

* cited by examiner

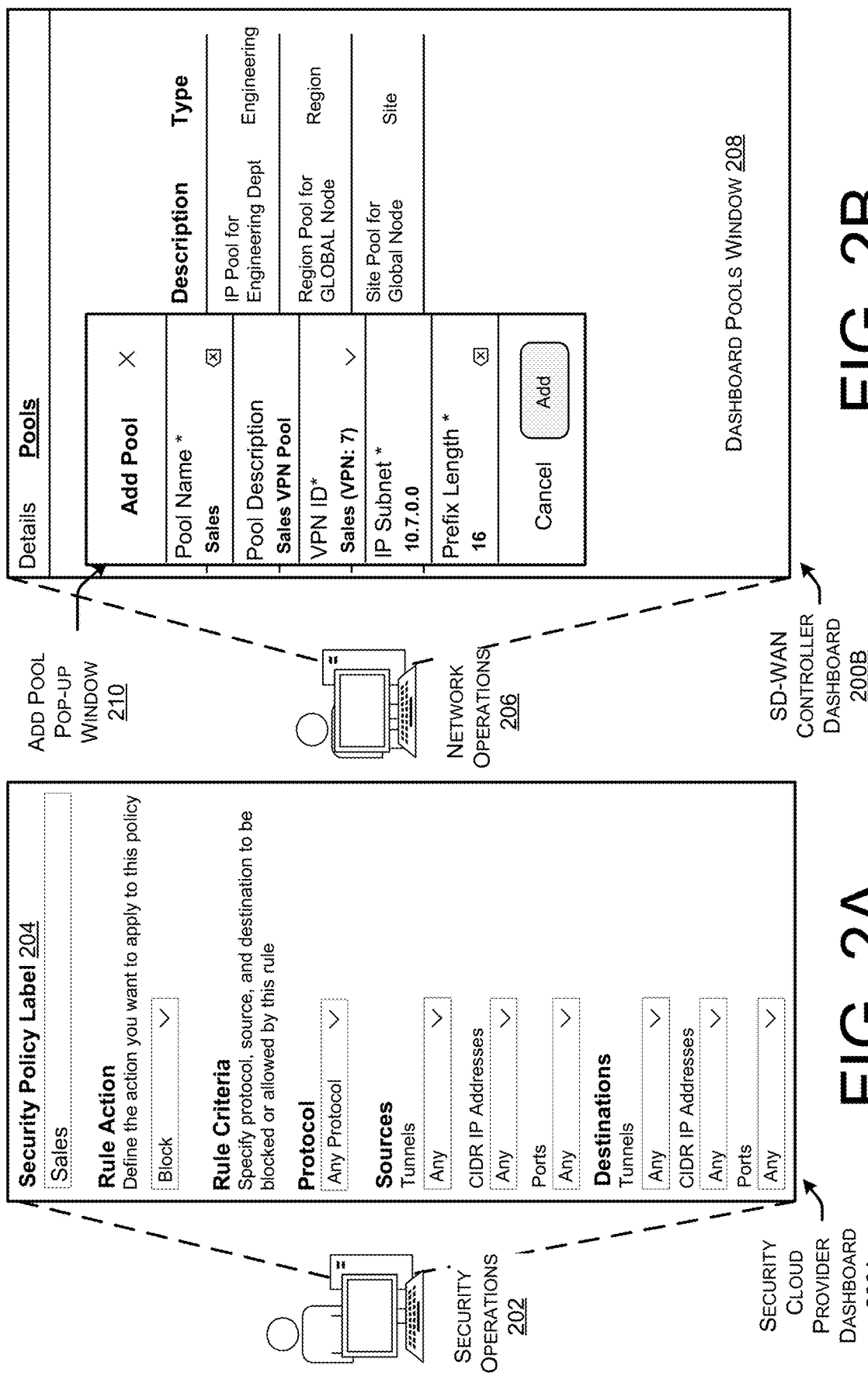

300 ⟶

```
┌─────────────────────────────────────────────────────────────────────┐
│ DEFINE, BY A SECURITY CLOUD PROVIDER, A SECURITY POLICY FOR AN      │
│ ENTITY, THE ENTITY REPRESENTED BY A VPN SECURITY POLICY LABEL,      │
│ WHEREIN THE SECURITY POLICY IS ABSENT SOURCE CIDR IP ADDRESS AND    │
│ DESTINATION CIDR IP ADDRESS                                         │
│                               302                                   │
└─────────────────────────────────────────────────────────────────────┘
                                  ↓
┌─────────────────────────────────────────────────────────────────────┐
│ NOTIFY, BY THE SECURITY CLOUD PROVIDER, AN SD-WAN CONTROLLER OF THE │
│                         SECURITY POLICY                             │
│                               304                                   │
└─────────────────────────────────────────────────────────────────────┘
                                  ↓
┌─────────────────────────────────────────────────────────────────────┐
│ MAP, BY THE SD-WAN CONTROLLER, THE VPN SECURITY POLICY LABEL TO AN  │
│                    IP ADDRESS POOL AND A VPN ID                     │
│                               306                                   │
└─────────────────────────────────────────────────────────────────────┘
                                  ↓
┌─────────────────────────────────────────────────────────────────────┐
│ ADD, BY THE SD-WAN CONTROLLER, AUTOMATICALLY AND BASED AT LEAST IN  │
│ PART OF THE MAPPING, SOURCE CIDR IP ADDRESSES AND DESTINATION CIDR  │
│ IP ADDRESSES TO THE SECURITY POLICY TO GENERATE AN ENHANCED         │
│ SECURITY POLICY                                                     │
│                               308                                   │
└─────────────────────────────────────────────────────────────────────┘
                                  ↓
┌─────────────────────────────────────────────────────────────────────┐
│ TRANSMIT, BY THE SD-WAN CONTROLLER, THE ENHANCED SECURITY POLICY TO │
│                     THE SECURITY CLOUD PROVIDER                     │
│                               310                                   │
└─────────────────────────────────────────────────────────────────────┘
                                  ↓
┌─────────────────────────────────────────────────────────────────────┐
│ DEPLOY, BY THE SD-WAN CONTROLLER, THE ENHANCED SECURITY POLICY TO   │
│                      AN SD-WAN BRANCH ROUTER                        │
│                               312                                   │
└─────────────────────────────────────────────────────────────────────┘
                                  ↓
┌─────────────────────────────────────────────────────────────────────┐
│ GENERATE, BY THE SD-WAN CONTROLLER, A VPN SEGMENT BETWEEN THE SD-   │
│ WAN BRANCH ROUTER AND THE SECURITY CLOUD PROVIDER TO ESTABLISH A    │
│ COMMON SECURE INTERNET GATEWAY TUNNEL FOR THE IP ADDRESS POOL       │
│                               314                                   │
└─────────────────────────────────────────────────────────────────────┘
```

FIG. 3

INTEGRATING SD-WAN CONSTRUCTS WITH SASE SECURITY POLICIES

TECHNICAL FIELD

The present disclosure relates generally to automatically integrating SD-WAN constructs to SASE security policies and automating security policy enrichment based on events in the SD-WAN such as VPN add/delete, and network device add/delete.

BACKGROUND

In today's networking environment, enterprise workforces are more dispersed than ever before which present challenges in securing users wherever they are. As a result, networking evolution is moving enterprise applications from data centers to the cloud, where larger and larger percentages of applications are consumed as Software-as-a-Service (Saas). The deployment of Software Defined Wide Area Networks (SD-WAN) enables enterprise organizations to securely connect users, applications, and data across multiple locations while providing improved performance, reliability, and scalability, while at the same time providing centralized control and visibility over the entire network. SD-WAN can be integrated with cloud-delivered security services to create a Secure Access Service Edge (SASE) architecture. SASE unifies networking and security services into a cloud-delivered service to provide access and security from edge to edge.

The integration of cloud security providers and SD-WAN networking requires coordination between network operations and security operations in order to define and implement security policies for dispersed enterprise organizations. A security operations security administrator is responsible for configuring security policies and a network operations network administrator is responsible for bringing up an SD-WAN overlay in the network. There is no unified policy definition across SD-WAN and security cloud providers, resulting in a complicated process of coordination in order to implement, or update, a security policy as the security administrator is unaware of the SD-WAN network constructs involved in the SD-WAN creation such as VPNs, IP addresses, subnet pools, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A illustrates an example of a security cloud provider's dashboard used to define a security policy for an entity as described herein.

FIG. 2B illustrates an example of an SD-WAN controller dashboard used to map a security policy received from the security cloud provider to network constructs as described herein.

FIG. 3 is a flow diagram illustrating an example method associated with the techniques described herein for mapping a security policy to network constructs.

DESCRIPTION OF EXAMPLE EMBODIMENTS

Overview

Figure 1:
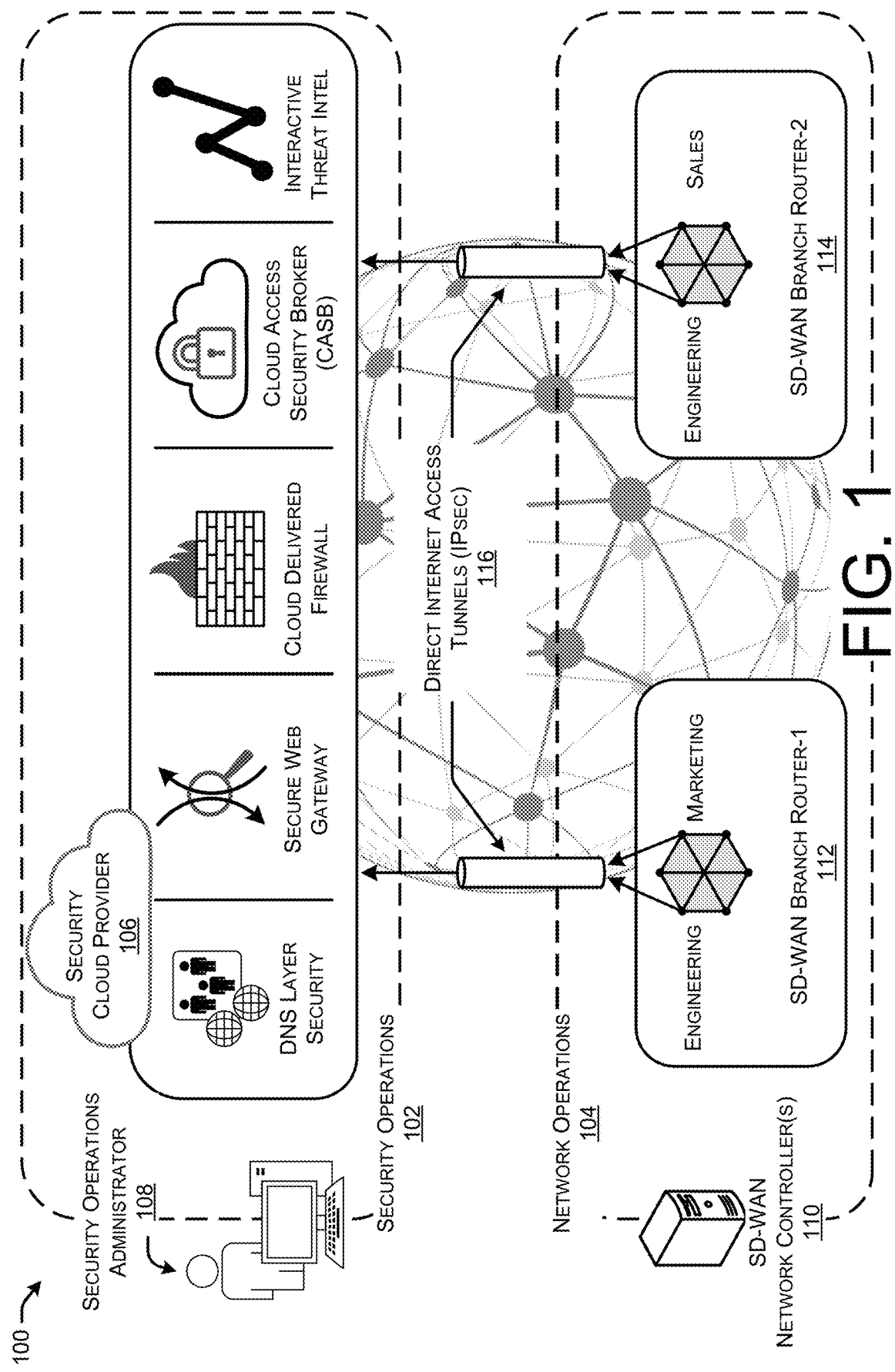
FIG. 1 illustrates an example environment that may implement various aspects of the technologies directed to automatically integrating SD-WAN constructs to SASE security policies and automating security policy enrichment based on events in the SD-WAN.

This disclosure describes method(s) for mapping networking constructs on a SD-WAN to a label that is used in a policy definition by a security cloud provider. The method includes defining, by a security cloud provider, a security policy for an entity, the entity represented by a Virtual Private Network (VPN) policy label, wherein the security policy is absent source Classless Inter-Domain Routing (CIDR) Internet Protocol (IP) addresses and destination CIDR IP addresses. In addition, the method includes notifying, by the security cloud provider, an SD-WAN controller of the security policy. The method also includes, mapping, by the SD-WAN controller, the VPN security policy label to an IP address pool and a VPN ID. Additionally, the method includes, adding, by the SD-WAN controller, automatically and based at least in part on the mapping, source CIDR IP addresses and destination CIDR IP addresses to the security policy to generate an enhanced security policy. The method also includes transmitting, by the SD-WAN controller, the enhanced security policy to the security cloud provider. The method may also include, deploying, by the SD-WAN controller, the enhanced security policy to an SD-WAN branch router. Finally, the method includes generating, by the SD-WAN controller, a VPN segment between the SD-WAN branch router and the security cloud provider to establish a common secure internet gateway tunnel for the IP address pool.

Additionally, the techniques described herein may be performed by a system and/or device having non-transitory computer-readable media storing computer-executable instructions that, when executed by one or more processors, performs the method described above.

Example Embodiments

As described above, a Software Defined Wide Area Network (SD-WAN) is a software-defined approach to managing the WAN, in response to the ongoing major technology shift to decentralized networks and security. Enterprise organizations are rapidly transitioning their infrastructure from a centralized data center model to a decentralized cloud model with features that are designed to deliver secure site-to-site and site-to-cloud connectivity from any location. SD-WAN can optimize user experience and efficiency for SaaS and public-cloud applications, and simplify operations with automation and cloud-based management that enables enterprise organization to securely connect users and applications across multiple locations. Additionally, Secure Access Service Edge (SASE) combines SD-WAN with advanced cloud delivered security features.

Today the integration of security cloud providers, or SASE Secure Internet Gateway (SIG) providers, and the SD-WAN fabric requires coordination between security operations administrators and network operations administrators. A SIG provider administrator is expected to know, from an SD-WAN administrator, SD-WAN network constructs (e.g., segmentation, IP address, VPN, CDIRs, or any other constructs associated with the SD-WAN necessary for implementing a security policy) in order to effectively define a security policy for an entity connected to the SD-WAN. For example, when defining a security policy for the engineering department of an enterprise organization, a security cloud provider administrator is required to know the SD-WAN network constructs (e.g., IP pool subnet information for engineering department) and manually enter them into a security cloud provider dashboard in order to successfully configure the security policy for the engineering department and have the policy successfully applied to all network communications to and from engineering personnel associated with the enterprise organization. However, conventionally, the security cloud provider administrator is unaware of the SD-WAN network constructs and therefore, must coordinate with SD-WAN network operations in order to acquire the necessary information which then must be manually entered by a security operations administrator in order to be effectively configure the security policy.

This disclosure describes techniques for automatically integrating SD-WAN constructs to SASE security policies. By using security policy labels (e.g., "engineering department" in the example above) known to both a security cloud provider and an SD-WAN fabric controller, the security cloud provider can define a policy and the SD-WAN controller can automatically map the network constructs to the security policy label, thereby enhancing the security policy, and push the enhanced security policy, with constructs included, to the security cloud provider, as well as deploy the enhanced security policy to network edges or branch devices.

When a security policy is defined by a security cloud provider, or SIG provider (e.g., Cisco Umbrella, Zscaler, etc.), the new security policy is typically initiated by a security operations administrator via a security operations dashboard user interface. The security cloud provider only needs to enter a security policy label (e.g., "engineering department"), and policy details (e.g., allow (or block) access to an application for users in the "engineering department"). The security operations administrator does not need to input any SD-WAN network segmentation details for the policy. For example, source CIDR IP addresses and destination CIDR IP address need not be known and input by the security operations administrator of the security cloud provider.

While the security operations administrator defines the security policy, the SD-WAN network administrator defines IP pools for individual VPNs, sites, regions or geo-locations via a network operations dashboard user interface of an SD-WAN controller. The IP pool is defined in the private IP space with a VPN ID encoded in the IP address as the second octet. The SD-WAN controller reads the security policy labels, defined by and received from the security cloud provider, and maps the security policy labels to the department name (e.g., engineering department) and VPN ID. The SD-WAN controller pulls the IP pool information for the VPN ID to auto define the per VPN Dynamic Host Configuration Protocol (DHCP) pool template and the SD-WAN controller pushes the enhanced security policy to SD-WAN devices. Additionally, the SD-WAN controller enhances the security policy to include network segmentation details (e.g., source CIDR addresses and destination CIDR addresses) and sends an HTTP PUT request with the enhanced security policy back to the security cloud provider.

Essentially, a security policy is defined by a security cloud provider with just a security policy label representing the network segmentation in the SD-WAN (e.g., enterprise organization department name, site name, geo-location name, etc.). The security policy defined by the SIG provider, is pulled into an SD-WAN controller via an Application Programming Interface (API) when triggered by events such as VPN definition, IP address pool creation, new branch device onboarding, etc. The extended information of the segmentation present on the SD-WAN side is automatically mapped to the security policy label by an SD-WAN controller, enhancing the security policy. This extension of the security policy binds the networking side details (e.g., IP addresses, tunnel names, etc.) that represent the site and device information, into the security policy. Additionally, the SD-WAN controller converts the policy intent from the security cloud provider to an SD-WAN security policy to be pushed to SD-WAN devices to maintain the same security posture for non-SIG traffic. Thus, the security posture is defined once and used for both cloud and on-prem security.

In addition to events that trigger a pull of security policy labels defined by the SIG provider into the SD-WAN controller, a periodic pull may be configured with a security policy pull time interval, to periodically pull security definitions from the security cloud provider. Thus, in the event that a security policy change is initiated for an entity by the security cloud provider, the SD-WAN controller will be notified of the change due to the periodic pull of security definitions from the security cloud provider via the API.

Additionally, on the SD-WAN operations side, security policy enhancement is automated based on events in the SD-WAN. For example, VPN add/delete, or network device add/delete may automatically trigger a security policy update by the SD-WAN controller. When a VPN is added or removed, the security policy can be automatically updated by the SD-WAN controller. Similarly, whenever a branch router is added or removed, the SD-WAN controller can update the security policy with the correct networking information. Once the SD-WAN controller updates the security policy, the SD-WAN controller automatically pushes the enhanced/updated policy to the security cloud provider as well as deploying the enhanced/updated security policy to SD-WAN devices. Thus, overall user experience is enhanced, and the operational complexity is reduced by seamlessly integrating SD-WAN constructs to SASE security policies.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 that may implement various aspects of the technologies directed to automatically integrating SD-WAN constructs to SASE security policies. Environment 100 includes security operations 102 and network operations 104. The security operations 102 is responsible for defining security policies and network operations 104 is responsible for bring up the SD-WAN overlay. Security operations 102 is unaware of the SD-WAN overlay creation, therefore unaware of the SD-WAN construct information (VPN ID, IP addresses, subnet pool, etc.) necessary to implement a security policy for an entity. Thus, traditionally, an excessive amount of coordination and information sharing has been required between security operations 102 and network operations 104, as well as manual intervention, in order for security operations to effectively create security policies for an enterprise organization connected to the SD-WAN. By implementing techniques described herein, network constructs can be abstracted from security operations 102 when defining security policies. The security policies can then be automatically enhanced by the SD-WAN network operations 104 to include the network constructs and pushed back to security operations 102, as well as deployed to SD-WAN network edge and branch devices.

Security operations 102 in example environment 100 includes a security cloud provider 106. The security cloud provider 106 provides a Secure Internet Gateway (SIG) connection for enterprise organizations. The security cloud provider 106 shown in FIG. 1 includes features such as DNS layer security, a secure web gateway, a cloud delivered firewall, a cloud access security broker (CASB), and interactive threat intel. However, the features provided by the security cloud provider 106 are an example of services that may be provided by a security cloud provider, and individual security cloud providers may offer more or fewer services and similar or different services, although it is assumed that a security cloud provider provides at least a secure internet gateway. Examples of security cloud providers are Cisco Umbrella, or Zscaler, but may be any appropriate security cloud provider that provides a secure internet gateway and other network security services for enterprise organizations. Security operations 102 also includes a security operations administrator 108 for the security cloud provider 106. The security operations administrator 108 may define a security policy for a network enterprise via a security cloud provider's dashboard, this process is described in detail below with reference to FIG. 2A.

Network operations 104 includes one or more SD-WAN network controllers 110. The SD-WAN network controllers 110 include a network management system with a dashboard that functions as a window into the SD-WAN and through which network administration may interact with the system. The network operations dashboard is described in detail below with reference to FIG. 2B. Also included in network operations 104 is SD-WAN branch router-1 112, that includes an enterprise organization's engineering and marketing departments, and SD-WAN branch router-2 114 that includes the enterprise organizations engineering and sales departments. Also included in FIG. 1 are direct internet access tunnels (IPsec VPN tunnels) 116 connecting SD-WAN branch router-1 112 and SD-WAN branch router-2 114 to the security cloud provider 106.

The security cloud provider 106 defines a security policy for an entity with just a VPN security policy label representing the network segmentation in the SD-WAN. For example, the security administrator 108 may define security policies for "engineering department", "marketing department", and "sales department" that are present at SD-WAN branch router-1 112 and SD-WAN branch router-2 114. The VPN security policy labels representing the security policies may be entered by the security administrator 108 into a security cloud provider 106 dashboard described below with reference to FIG. 2A. When entering the VPN security policy labels representing the network segmentation in the SD-WAN, the security administrator does not need to know; and does not need to manually input, the network segmentation information such as protocol, tunnel names, source CIDR IP addresses and destination CIDR IP addresses, etc.

The security policies defined by the security cloud provider 106 (VPN security policy labels representing the network segmentation) are pulled into the SD-WAN network controller(s) 110 of the network operations 104 by an out of band API. The SD-WAN network controller(s) 110 map the VPN security policy labels to IP address pools and VPN ID's. Source CIDR IP addresses and destination CIDR IP addresses are added to the security policies to generate an enhanced security policy, and the enhanced security policies are pushed (via an HTTP PUT request) back to the cloud security provider 106. In addition, IP pool information is used to auto define the per VPN DHCP pool template and pushed to the SD-WAN network edge and branch devices. The SD-WAN network controller 110 then generates an IPsec VPN segment between the SD-WAN branch router (e.g., SD-WAN branch router-1 112 and SD-WAN branch router-2 114) and the security cloud provider 106 as illustrated in FIG. 1 as the IPsec direct internet access tunnels 116. The IPsec VPN segment establishes a common Secure Internet Gateway tunnel between the branch device and the security cloud provider 106.

In addition to pushing the enhanced security policy back to the cloud security provider 106, the SD-WAN controller 110 also deploys the enhanced security policy to on-prem devices, thus providing the same security posture for on-prem and cloud security. In other words, a security policy is defined once by the security administrator 108 of the security cloud provider 106, enhanced by the SD-WAN controller 110, pushed back to the security cloud provider 106 and deployed to other SD-WAN network devices such as SD-WAN branch router-1 112 and SD-WAN branch router-2 114, thus providing the same security posture for on-prem and cloud security.

FIG. 2A illustrates an example security cloud provider dashboard 200A for defining a security policy for an entity. The security provider dashboard 200A is merely an example, and any given security cloud provider dashboard may have more or fewer options, similar or different option, the same or different interactive elements (e.g., pull down menus, selection buttons, text boxes, etc.), and may be displayed in a similar or different layout.

The security cloud provider dashboard 200A may be used by an administrator of security operations 202 to define a security policy for an entity. In the example shown in FIG. 2A, a security policy label 204 is defined as "Sales" indicating that it is a security policy for the sales department of an enterprise organization. The policy for the sales department is to "Block" access to an application or specific data, etc. (not specifically shown). Traditionally, when defining a security policy by security operations 202 of a security cloud provider, an administrator is required to know; and manually input, the protocol to specify as well as source and destination tunnels, CIDR IP addresses and ports. However, by implementing techniques described herein, the protocols, source and destination tunnels, CIDR IP addresses, and ports are not required to be manually input by the security operations administrator of the security cloud provider. They may be set to "any" or remain blank, there is no need to explicitly specify any particular protocol, tunnels, CIDR IP addresses, or ports. The security policy is simply defined by a security policy label that indicates a department, site, region, etc. of an enterprise organization. This greatly reduces the prolonged interaction and coordination between security operations 202 and network operations 206 (illustrated in FIG. 2B) required to define and implement security policies for enterprise organizations, as the security operations administrator does not need to know network segmentation detail in order to define a security policy as has been traditionally required. Security operations 202 and network operations 206 do not need to agree on a network range needed for a security policy definition.

FIG. 2B illustrates an example of an SD-WAN controller dashboard 200B used to map a security policy received from the security operations 202 of a security cloud provider to network constructs as described herein. Similar to the security provider dashboard illustrated in FIG. 2A, the SD-WAN controller dashboard 200B is merely an example, and any given security cloud provider dashboard may have more or fewer options, the same or different options, the same or different interactive elements, and may be displayed in a similar of different manner.

The SD-WAN controller dashboard may be used by an administrator of network operations 206 to define IP pools as illustrated in FIG. 2B. Three IP pools have previously been defined (Engineering, region, site) and are shown on the display of the dashboard Pools window 208. Also included in FIG. 2B is an example add pool pop-up window 210 for defining new IP pools. The security policy label "Sales" as defined in the security cloud provider dashboard 200A of FIG. 2A, is pulled into the SD-WAN controller dashboard 200B via an API, and is shown in the "Pool Name" in the add pool pop-up window 210. The SD-WAN controller knows which IP pool is allocated for the sales department, so the SD-WAN maps the VPN ID, IP subnet, and prefix length to the "Sales" security policy label by automatically populating the VPN ID, IP subnet, and prefix length in the add pool pop-up window 210 when the pool name "Sales" is indicated as the IP pool to add. By mapping the network constructs (VPN ID, IP subnet, and prefix length) to the "Sales" security policy label, the SD-WAN controller enhances the "Sales" security policy and pushes the enhanced security policy back to the SIG provider via an HTTP PUT request, and deploys the enhanced security policy to SD-WAN network devices, for example SD-WAN branch router-1 112 and SD-WAN branch router-2 114 as illustrated in FIG. 1 and described above.

FIG. 3 is a flow diagram illustrating an example method 300 associated with the techniques described herein for seamlessly integrating SD-WAN constructs to SASE security policies. Example method 300 illustrates aspects of the functions performed by the security operations 102 and network operation 104 as described in FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302, a security cloud provider defines a security policy for an entity. The entity is represented by a VPN security policy label and the security policy does not include a source CIDR IP address or a destination CIDR IP address for which to apply the security policy. The policy defined by the security cloud provider is a simple language version of policy instructions. For example, "allow (or block) access to the Internet by the engineering department". The policy is absent any network construct details. For example, in FIG. 1 the security cloud provider 106 may define a security policy for engineering, marketing, and/or sales. Further detail is shown in FIG. 2A, where security operations defines a VPN security policy label 204, "Sales" in a security cloud operations dashboard 200A. The security policy does not required input of any network constructs. As shown in FIG. 2A, protocol and source and destination information (tunnels, CIDR IP addresses, and ports) are entered as "any".

At operation 304, the security cloud provider notifies an SD-WAN controller of the security policy. Whenever a new security policy is defined or updated by the security cloud provider, the SD-WAN controller pulls the policy into a dashboard via an out of band API. For example, in FIG. 1 the SD-WAN network controller 110 receives the security policy defined by the security cloud provider 106. Further detail is illustrated in FIG. 2B, where the SD-WAN controller dashboard 200B shows the pool name "Sales" in the pool name of the add pool pop-up window 210 that corresponds to the security policy label 204 "Sales" as defined by security operations 202 in the security cloud provider dashboard 200A as shown in FIG. 2A.

At operation 306, the SD-WAN controller maps the VPN security policy label to an IP address pool and a VPN ID. The SD-WAN controller reads the VPN security policy label received from the security cloud provider, and maps the VPN security policy label to the VPN ID and pulls IP address pool information for the VPN ID. For example, in FIG. 2B, once the SD-WAN controller pulls in the security policy label "Sales" into the pool name of the add pool pop-up window 210, the VPN ID, IP subnet, and prefix length sections of the add pool pop-up window 208 are automatically populated with the network segmentation information associated with "Sales".

At operation 308, the SD-WAN controller automatically adds source CIDR IP addresses and destination CIDR IP addresses to the security policy to generate an enhanced security policy. For example, in FIG. 2B the source CIDR IP addresses and destination CIDR IP addresses in the IP subnet 10.7.0.0 are automatically added to the security policy to generate an enhanced security policy.

At operation 310, the SD-WAN controller transmits the enhanced security policy to the security cloud provider. For example, with reference to FIG. 1 once the SD-WAN network controller 110 generates the enhanced security policy, the enhanced security policy is pushed back to the security cloud provider 106, for example by an HTTP PUT request. Additionally, when a triggering event occurs in the SD-WAN, such as VPN add/delete or network device add/delete, an enhanced security policy is automatically updated by the SD-WAN network controller 110 and pushed to the security cloud provider 106.

At operation 312, the SD-WAN controller deploys the enhanced security policy to an SD-WAN branch router. For example, with reference to FIG. 1 once the SD-WAN network controller 110 generated the enhanced security policy, the SD-WAN network controller 110 deploys the enhanced security policy to SD-WAN network devices like the SD-WAN branch router-1 112 and SD-WAN branch router-2 114. Similar to operation 310, when a triggering event occurs in the SD-WAN, such as VPN add/delete or network device add/delete, an enhanced security policy is automatically updated by the SD-WAN network controller 110 and deployed to SD-WAN network devices like the SD-WAN branch router-1 112 and SD-WAN branch router-2 114. Thus, a policy intent from the security cloud provider 106 is converted to an SD-WAN security policy and pushed to SD-WAN device to maintain the same security posture for non-SIG traffic.

At operation 314, the SD-WAN controller, generates a VPN segment between the SD-WAN branch router and the security cloud provider to establish a common secure internet gateway tunnel for the IP address pool. For example, with reference to FIG. 1 the SD-WAN network controller 110 generates the VPN segments, direct internet access tunnels (IPsec) 116, between the branch routers (router-1 112 and router-2 114) and the security could provider 106.

Figure 4:
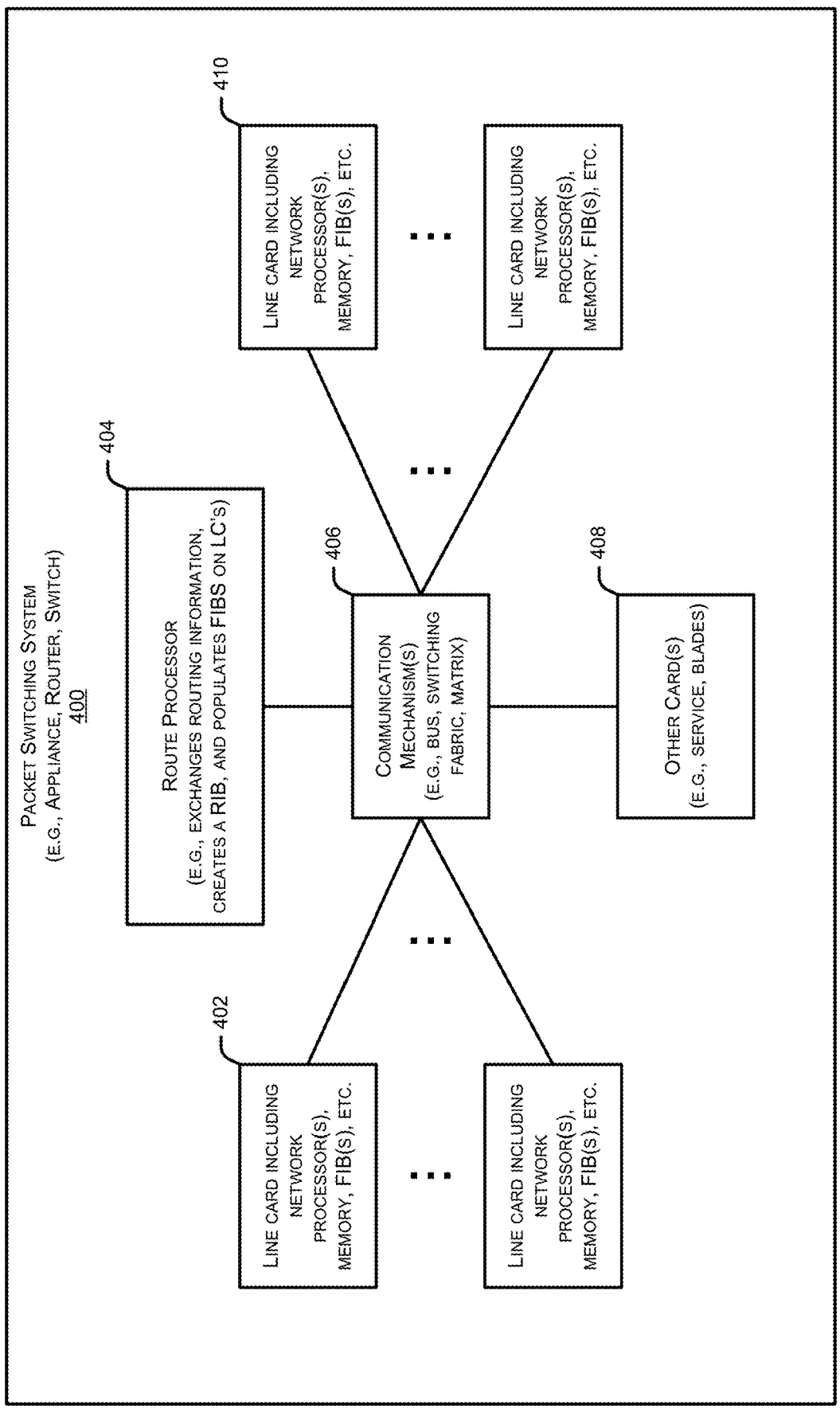
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, SD-WAN branch router-1 112 and SD-WAN branch router-2 114 in the SD-WAN network described with respect to FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities, line cards 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
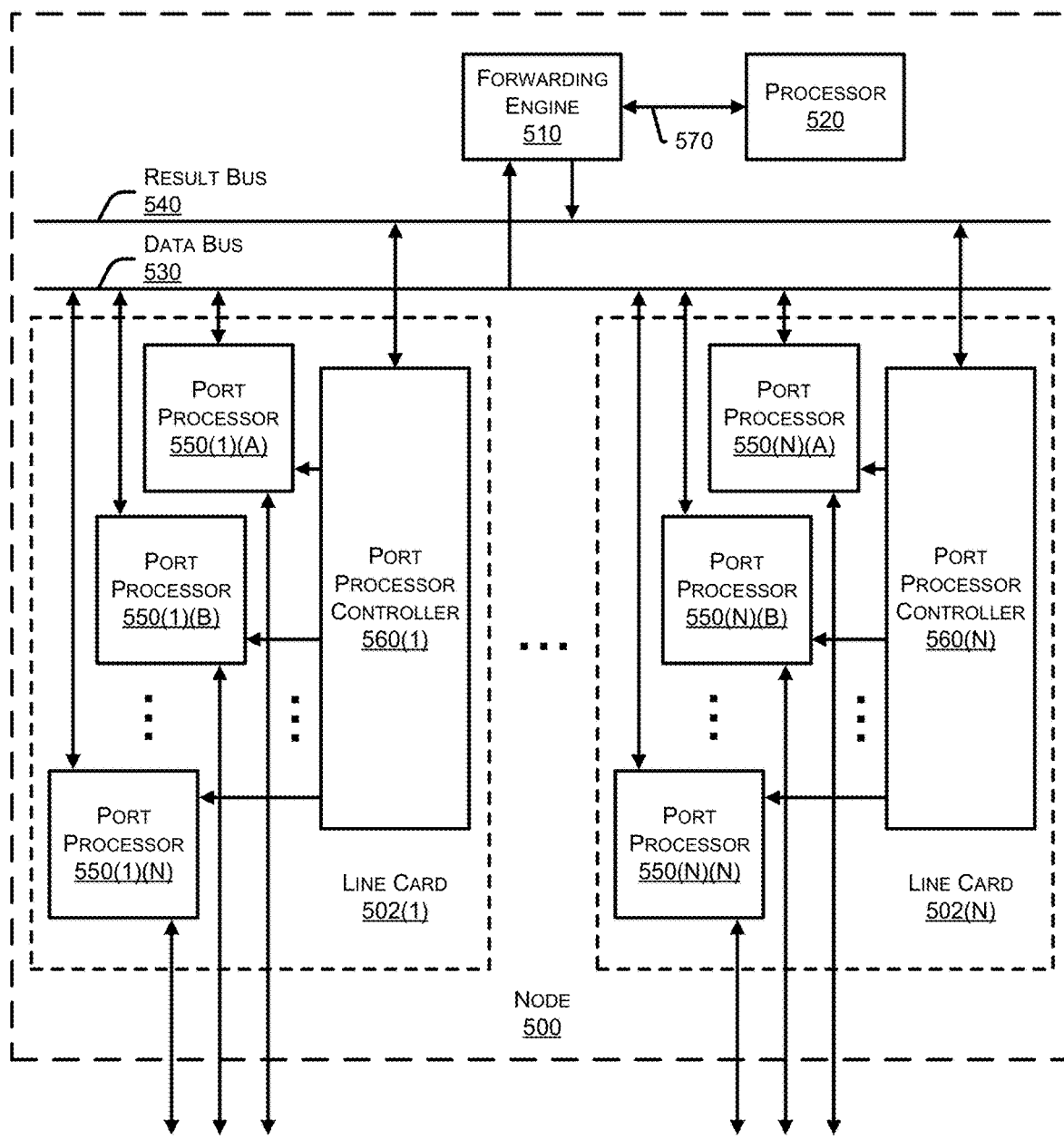
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, the SD-WAN network as described with respect to FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or may add packet security information in order to secure the packet. On a node 500 sourcing such a packet or packet and header, this processing may include, for example, encryption of some or all of the packets or packet and header's information, the addition of a digital signature, and/or some other information and/or processing capable of securing the packet or packet and header. On a node 500 receiving such a processed packet or packet and header, the corresponding process may be performed to recover or validate the packets or packet and header's information that has been secured.

Figure 6:
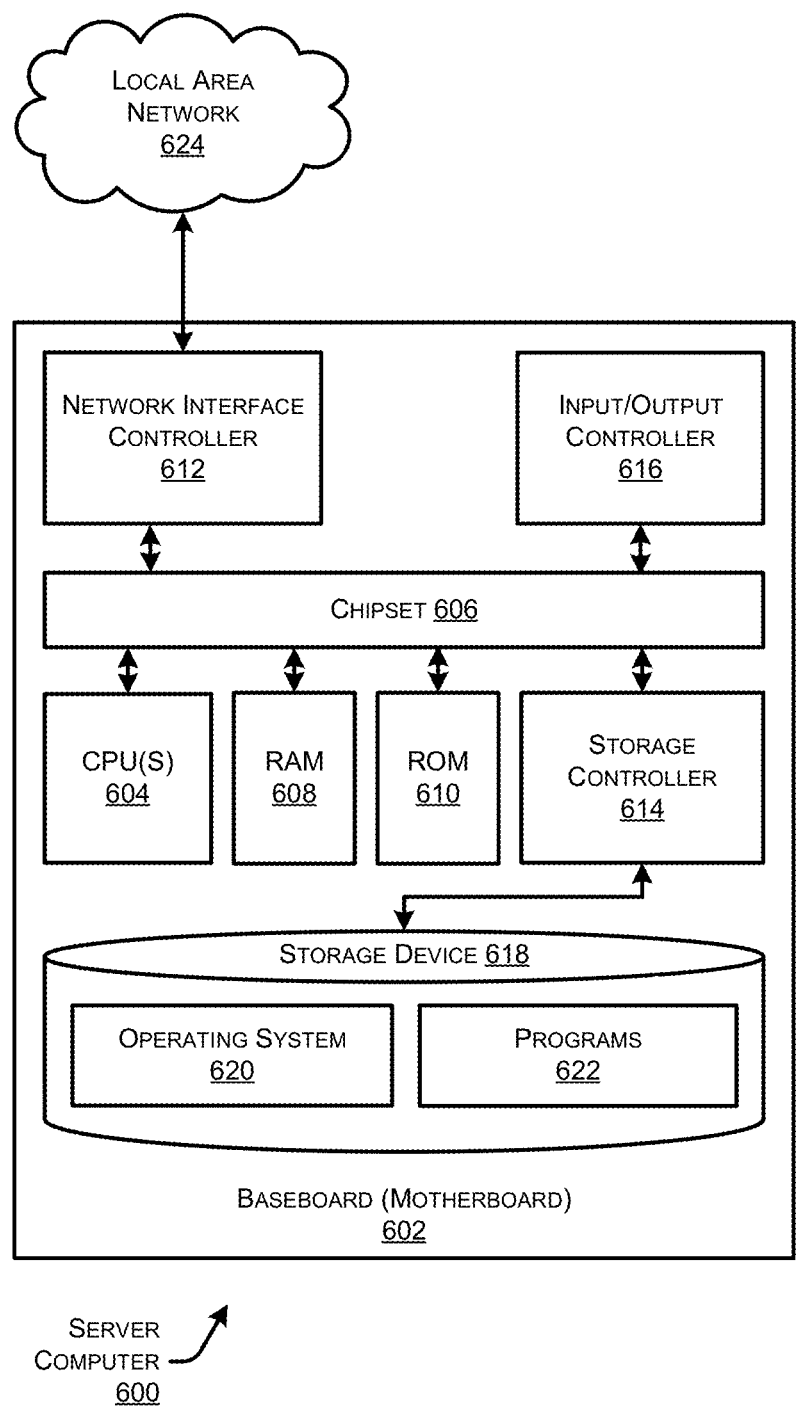
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a SD-WAN network controller 110, the packet switching system 400, and/or the node 500 described herein with respect to FIGS. 1, 4, and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the network device(s) 102-108, and or any components included therein, may be supported by one or more devices similar to computing device 600. Stated otherwise, some or all of the operations performed by the network device(s) 102-108, and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIG. 3. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for automatically integrating Software Defined Wide Area Network (SD-WAN) constructs to security policies, the method comprising:
    defining, by a security cloud provider, a security policy for an entity, the entity represented by a Virtual Private Network (VPN) security policy label, wherein the security policy is absent source Classless Inter-Domain Routing (CIDR) Internet Protocol (IP) addresses and destination CIDR IP addresses;
    notifying, by the security cloud provider, an SD-WAN controller of the security policy;
    mapping, by the SD-WAN controller, the VPN security policy label to an IP address pool and a VPN ID;
    adding, by the SD-WAN controller, automatically and based at least in part on the mapping, source CIDR IP addresses and destination CIDR IP addresses to the security policy to generate an enhanced security policy;
    transmitting, by the SD-WAN controller, the enhanced security policy to the security cloud provider;
    deploying, by the SD-WAN controller, the enhanced security policy to an SD-WAN branch router; and
    generating, by the SD-WAN controller, a VPN segment between the SD-WAN branch router and the security cloud provider to establish a common secure internet gateway tunnel for the IP address pool.

2. The method of claim 1, wherein notifying the SD-WAN controller of the security policy is via an out of band Application Programming Interface (API).

3. The method of claim 1, wherein the VPN ID is encoded in an IP address as a second octet.

4. The method of claim 1, further comprising pushing, by the SD-WAN controller, the enhanced security policy to on-prem devices providing a same security posture for on-prem and cloud security.

5. The method of claim 1, further comprising, automatically updating the enhanced security policy, by the SD-WAN controller, when a VPN is added or removed or when a branch router is added or removed from the SD-WAN.

6. The method of claim 1, wherein the security policy is defined by a security operations administrator of the security cloud provider via a security provider dashboard, and the VPN security policy label mapping is automatically displayed via an SD-WAN controller dashboard.

7. The method of claim 1, further comprising defining, by the SD-WAN controller, IP pools for individual VPNS, sites, regions, or geo-locations.

8. A system comprising:
    one or more processors; and
    one or more computer-readable media storing computer-executable instructions that, when executed by the one or more processors, cause the one or more processors to perform operations comprising:
        defining, by a security cloud provider, a security policy for an entity, the entity represented by a Virtual Private Network (VPN) security policy label, wherein the security policy is absent source Classless Inter-Domain Routing (CIDR) Internet Protocol (IP) addresses and destination CIDR IP addresses;
        notifying, by the security cloud provider, an SD-WAN controller of the security policy;
        mapping, by the SD-WAN controller, the VPN security policy label to an IP address pool and a VPN ID;
        adding, by the SD-WAN controller, automatically and based at least in part on the mapping, source CIDR IP addresses and destination CIDR IP addresses to the security policy to generate an enhanced security policy;
        transmitting, by the SD-WAN controller, the enhanced security policy to the security cloud provider;
        deploying, by the SD-WAN controller, the enhanced security policy to an SD-WAN branch router; and
        generating, by the SD-WAN controller, a VPN segment between the SD-WAN branch router and the security cloud provider to establish a common secure internet gateway tunnel for the IP address pool.

9. The system of claim 8, wherein transmitting the security policy to an SD-WAN controller is via an out of band Application Programming Interface (API).

10. The system of claim 8, wherein the VPN ID is encoded in an IP address as a second octet.

11. The system of claim 8, the operations further comprising pushing, by the SD-WAN controller, the enhanced security policy to on-prem devices providing a same security posture for on-prem and cloud security.

12. The system of claim 8, the operations further comprising, automatically updating the security policy when a VPN is added or removed, or when a branch router is added or removed.

13. The system of claim 8, wherein the security policy is defined by a security operations administrator of the security cloud provider via a security provider dashboard, and the VPN security policy label mapping is automatically displayed via an SD-WAN controller dashboard.

14. The system of claim 8, further comprising defining, by the SD-WAN controller, IP pools for individual VPNS, sites, regions, or geo-locations.

15. One or more non-transitory computer-readable media storing instructions that, when executed, cause one or more processors to perform operations comprising:
- defining, by a security cloud provider, a security policy for an entity, the entity represented by a Virtual Private Network (VPN) security policy label, wherein the security policy is absent source Classless Inter-Domain Routing (CIDR) Internet Protocol (IP) addresses and destination CIDR IP addresses;
- notifying, by the security cloud provider, an SD-WAN controller of the security policy;
- mapping, by the SD-WAN controller, the VPN security policy label to an IP address pool and a VPN ID;
- adding, by the SD-WAN controller, automatically and based at least in part on the mapping, source CIDR IP addresses and destination CIDR IP addresses to the security policy to generate an enhanced security policy;
- transmitting, by the SD-WAN controller, the enhanced security policy to the security cloud provider;
- deploying, by the SD-WAN controller, the enhanced security policy to an SD-WAN branch router; and
- generating, by the SD-WAN controller, a VPN segment between the SD-WAN branch router and the security cloud provider to establish a common secure internet gateway tunnel for the IP address pool.

16. The one or more non-transitory computer-readable media of claim 15, wherein transmitting the security policy to an SD-WAN controller is via an out of band Application Programming Interface (API).

17. The one or more non-transitory computer-readable media of claim 15, wherein the VPN ID is encoded in an IP address as a second octet.

18. The one or more non-transitory computer-readable media of claim 15, further comprising pushing, by the SD-WAN controller, the enhanced security policy to on-prem devices providing a same security posture for on-prem and cloud security.

19. The one or more non-transitory computer-readable media of claim 15, the operations further comprising, automatically updating the security policy when a VPN is added or removed, or when a branch router is added or removed.

20. The one or more non-transitory computer-readable media of claim 15, wherein the security policy is defined by a security operations administrator of the security cloud provider via a security cloud provider dashboard, and the VPN security policy label mapping is automatically displayed via a SD-WAN controller dashboard.

\* \* \* \* \*